Patented July 30, 1940

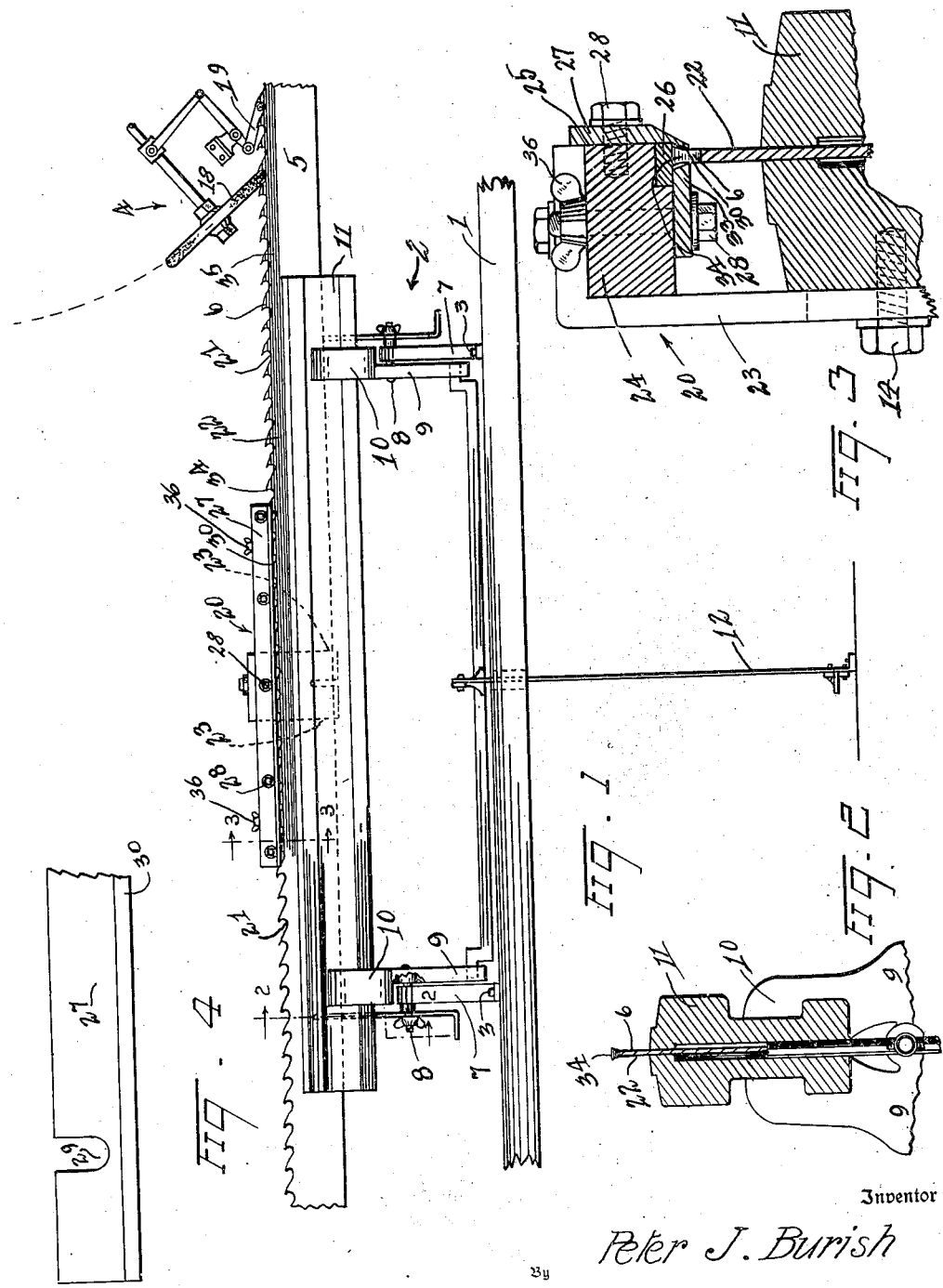

2,209,674

UNITED STATES PATENT OFFICE 2,209,674

METHOD OF TENSIONING BAND SAWS

Peter J. Burish, Milton, Oreg.

Application September 21, 1938, Serial No. 230,988

2 Claims. (Cl. 148—21.5)

This invention relates to a method of and apparatus for restoring or renewing the tension in band saws and has as one of its objects to heat treat all saws of like cross section uniformly and with like precision.

Another object of the invention is to heat treat band saws and during treatment maintain their uniform characteristics by visual observation.

A further object of the invention is to heat treat band saws by defining a path or band along which treatment will be confined. The width of the path to be treated is at least ⅝ of an inch, measuring from the gullet line toward the center line of the web, said width providing the mass of metal necessary that when upset, as a result of heating and air-cooling, will provide the necessary tension in the blade to maintain its "truth."

A further object of the invention is to provide a method of heat treatment for band saws by the application of heat from a mild flame and air-cooling the heated saw in sections, then intermittently advancing the saw for successive treatment in cycles, either manually or automatically.

A further object of the invention is to provide an adjustable buckle stop which, taken in conjunction with a standard saw clamp, will facilitate heat treatment of a band saw by maintaining the alignment thereof during treatment and thus expedite the process.

A further object of the invention is to provide means that, taken in conjunction with standard filing room machinery, will be relatively cheap to construct and that is highly efficient in the work for which it is intended.

Other objects will be apparent as the specification proceeds.

In accordance with the invention I contemplate utilizing the standard saw clamp, found in all well equipped filing rooms, in which the blade is loosely inserted with just sufficient pressure to maintain the saw in a truly aligned position but with a looseness to permit movement longitudinally of the saw by manual or automatic means.

In following my method I place the saw in the clamp in the usual position with relation to the automatic grinding machine for grinding, which position is well known to those skilled in the art and hence needs no further description.

In preparation for treatment I cover the cutting edges of the teeth and the swage, and adjusting the covering means to provide an exposed path or band of a width of at least ⅝ of an inch, and extended between the gullet and the clamp jaws, this width having been found by trial to provide sufficient metal that when heated and cooled will upset within itself and by upsetting will present a greater thickness at the band and throughout the treated portion (represented by the series of parallel lines in Fig. 1) that will, when the treatment is completed, shorten the length thereof and thus provide for the proper tension of the blade.

Normally when heat is applied to any piece of sheet metal, having one edge maintained in true alignment, the expansion caused by the heat will cause more or less of a deformation, both longitudinally and in a transverse direction, and to minimize undue distortion a transverse buckle stop (to be explained) is adjustably attached to the clamp and positioned to cover the swage of the teeth as a protection for the sharpened edges thereof; to define the outside line of the treated path; and to provide a rigid straight-edge paralleling the jaws of the clamp to prevent transverse buckling.

By this means distortion transversely is obviated and the true alignment of the teeth is also maintained.

It is now apparent that by applying heat to the exposed portion of the blade at the tension line, and permitting no transverse expansion, any expansion will be in a longitudinal direction, until stopped by the cooler adjacent portions, when the heated metal will upset within itself and become thicker than the remaining body of the saw, the contraction by air-cooling providing the necessary shortening along the tension line without materially effecting the characteristics of the metal of the blade.

In the treatment a mild flame is utilized and the uniformity of treatment is determined by the resultant blue color.

Treatment is effected preferably in sections, by treating one half of the exposed portion of the blade, then treating the remaining half while the first half air-cools, then advancing the blade and repeating the treatment on the adjacent section, continuously until finished.

The apparatus for carrying out my method is represented in the accompanying drawing in which Fig. 1 is a front elevation of a standard clamp showing its relative position with a grinding machine, represented by the abrasive wheel and advancing mechanism, and showing a removably mounted transverse buckle stop disposed on the clamp together with its relative length with relation to the clamp;

Fig. 2 is an end elevation of the clamp taken on the line 2—2 of Fig. 1;

Fig. 3 is a vertical section of a fragment of the clamp jaws taken on the line 3—3 of Fig. 1, and shows the relative position of the various parts of the transverse buckle stop and its relative position vertically with the clamp jaws, substantially full size; and Fig. 4 shows a front elevation of a fragment of the front plate and adjusting notch.

Having reference to the drawing like numerals refer to like parts throughout the several views and the numeral 1 refers to a fragment of a bench top on which the clamp 2 is securely attached by the usual lag screws or the like securing means, represented as at 3, which clamp is positioned adjacent to the grinding machine 4 to form a guide and support for the band saw 5, when it is necessary, for simultaneously sharpening the teeth 6 of the saw during heat treatment.

The clamp consists of a pair of supporting legs 7, each leg being provided with a pivot bolt 8 extended horizontally through the upper ends of the legs, and mounted on these pivot bolts for opposed operation are arms 9 which terminate at their upper ends in plates 10 secured to the jaws 11 of the clamp whereby to receive an expanse of blade, of substantially four feet in length (the usual length of a clamp) and to secure said blade with a selected degree of pressure when operated preferably by a foot mechanism, represented in Fig. 1 as at 12, all of which being old in the art of clamps further description is deemed unnecessary.

In the filing room the clamp is positioned adjacent the automatic grinding machine, represented in Fig. 1 at 4, wherein the essential parts are the grinding element 18, and in addition the advancing mechanism 19 which moves the succeeding tooth to a position for grinding.

The saw, owing to its continuous length, is treated in successive operations and on sections of the blade, the length of each section being determined for convenience, or by the length of one-half of the buckle stop (to be described) which length is not of prime importance as will be noted as the description proceeds.

In preparation the saw is entered lengthwise between the jaws of the clamp which are then closed on the saw, with sufficient looseness or clearance to enable the blade either to be automatically advanced a tooth at a time by the advancing mechanism 19 or, when grinding is not required the grinding machine 4 may be disconnected and the saw moved manually in sections, each section being considered as of a length equalling one-half the length of the transverse buckle stop 20, as above mentioned.

The blade in the clamp is adjusted to a position to bring the bottom line of the gullets 21 parallel to and distant from the top line of the clamp jaws, a distance of at least 5/8 of an inch, this distance having been found by trial to properly effect the blade under treatment, along the tension line 22 thereof.

The transverse buckle stop 20 is adjustably secured to a jaw of the clamp by a bolt 14 passing through a slotted support, represented by the vertical dotted lines 23 in Fig. 1, and fragmentary in Fig. 3, by which the stop may be adjusted as to height and parallel to the top line of the jaw, and consists of a foundation block 24 which is substantially rectangular in cross section, one face 25 being provided with a rectangular recess to receive a correspondingly shaped strip 26 of hard steel, and a face plate 27 which lies against face 25 of the block and is held in place by cap screws 28.

The face plate 27 is made slidable and adjustable on the cap screws by being slotted, as represented at 29 in Fig. 4, and their purpose will be presently explained.

The face plate 27 is provided at its lower side with a chisel edge 30, the edge being disposed inward toward the block so as to engage one side of the teeth 6 on the saw. A back plate 33 is adjustably secured by bolts 28 and wing nuts 36 to the bottom of the block 24 so that its right hand edge (Fig. 3) lightly contacts the other side of the teeth of the saw.

The face plate 27 and back plate 33 are of hardened steel, to resist grooving by the sliding movement of the saw which grooving would effect the sharpened tooth edge 34 of the saw and render resharpening necessary.

The purpose of the stop is to slidably guide the sharpened tooth edge 34 of the saw and prevent its delicate cutting edge from being dulled by the heat, and proper adjustment of the face plate and back plate provide a channel therein that will maintain the true alignment of the saw, transversely and longitudinally, and of the teeth with one another to produce a true kerf.

The stop 20 is rigidly secured to the clamp and rests with the strip 26 on the teeth of the saw, and the saw in turn is fixedly held by the clamp whereby the tendency of the treatment to warp the blade transversely is obviated and hence the treated portion is upset within itself and the true alignment is retained.

In operation the saw is positioned as above explained, in the clamp, the sharpened edge and swage of the teeth covered and the heat then applied preferably to one-half of the length of the exposed band.

When the color blue (represented by the parallel lines 35 shown on the upper edge of the blade) shows that the heat has been uniformly distributed the heat is withdrawn and the heated half of the section is permitted to air-cool.

After or during cooling the blade will be moved to the remaining half of the section and the process then repeated.

Obviously the saw may be moved manually, or automatically by the filing machine, as above explained, in which latter case the slowness of movement will permit the necessary interval of time for treatment and cooling of each half of the section.

Heat treatment is recognized as being old in the art, however in substantially all cases the treatment of band saws has required more or less expensive apparatus and has never, to my knowledge, been accomplished with the uniformity and precision described herein, or by the aid of the simple apparatus here shown for use in combination with standard filing room equipment whereby the added expense is reduced substantially, and while its universality obviates the necessity of a tool for each size of blade, extensive adjustments are also minimized.

Having thus described my invention, I claim:

1. A method of tensioning band saws which consists in heating to a blue color the band saw blade in consecutive sections along a narrow zone extending immediately below the teeth of the saw blade while holding and supporting said blade sections along longitudinal zones adjacent both edges of said narrow zone to maintain the blade section under heat treatment straight and to prevent any transverse expansion, thus causing the material in the heated zone of the saw-blade to upset within itself, and air-cooling the heated zone before the blade is advanced for treating the next section.

2. A method of tensioning band saws which consists in heating to a blue color the band saw blade in consecutive sections along a narrow zone extending from the gullet downwardly into the body of the saw blade and lengthwise of the latter, said heating taking place while holding and supporting said blade sections along longitudinal zones adjacent both edges of said narrow zone to maintain the blade section under heat treatment straight and to prevent any transverse expansion, thus causing the material in the heated zone of the saw blade to upset within itself, and air-cooling the heated zone before the blade is advanced for treating the next section.

PETER J. BURISH.